United States Patent
Xie

(10) Patent No.: US 10,607,564 B2
(45) Date of Patent: Mar. 31, 2020

(54) SIGNAL RELAYING DEVICE AND SIGNAL RELAYING METHOD

(71) Applicant: ATEN International Co., Ltd., New Taipei (TW)

(72) Inventor: Kun-Feng Xie, New Taipei (TW)

(73) Assignee: ATEN International Co., Ltd., New Taipei (TW)

( * ) Notice: Subject to any disclaimer, the term of this patent is extended or adjusted under 35 U.S.C. 154(b) by 80 days.

(21) Appl. No.: 15/943,539

(22) Filed: Apr. 2, 2018

(65) Prior Publication Data

US 2018/0293957 A1 Oct. 11, 2018

(30) Foreign Application Priority Data

Apr. 7, 2017 (TW) .............................. 106111795 A

(51) Int. Cl.
*G06G 5/00* (2006.01)
*G06F 13/40* (2006.01)
(Continued)

(52) U.S. Cl.
CPC ............... *G09G 5/006* (2013.01); *G06F 3/14* (2013.01); *G06F 13/4027* (2013.01);
(Continued)

(58) Field of Classification Search
CPC .......... G06G 5/006; H04B 1/44; H04L 29/06; H04L 65/06
See application file for complete search history.

(56) References Cited

U.S. PATENT DOCUMENTS

| 8,072,549 B2 | 12/2011 | Inoue et al. |
| 2010/0053463 A1* | 3/2010 | Yeh ........................ H04N 5/775 348/734 |

(Continued)

FOREIGN PATENT DOCUMENTS

TW   I460677 B   11/2014

OTHER PUBLICATIONS

Core Brands, LLC, "EXT-UHD600A-12-DS GEFEN 4K Ultra HD 600 MHz 1:2 Scaler w/ Edid Detective and Audio De-Embedder", http://resources.corebrands.com/products/EXT-UHD600A-12-DS/pdf_EXT-UHD600A-12-DS_datasheet.pdf, Dec. 2017.

(Continued)

*Primary Examiner* — Getente A Yimer
(74) *Attorney, Agent, or Firm* — Chen Yoshimura LLP

(57) ABSTRACT

A signal relaying device applied to DisplayPort architecture is disclosed. The signal relaying device is coupled between a source device and a sink device and includes a receiving end, an arbiter and a transmitting end. The receiving end receives a request signal from the source device via the first auxiliary channel. The arbiter is coupled to the receiving end and receives the request signal. The transmitting end receives the request signal from the arbiter and transmits the request signal to the sink device via the second auxiliary channel. The sink device transmits a first configuration data to the transmitting end via the second auxiliary channel when receiving the request signal. The arbiter replaces the first configuration data with the second configuration data and transmits the second configuration data to the receiving end when receiving the first configuration data from the transmitting end.

15 Claims, 4 Drawing Sheets

(51) Int. Cl.
*G06F 3/14* (2006.01)
*G06F 21/85* (2013.01)
*G09G 5/00* (2006.01)

(52) U.S. Cl.
CPC ... *G06F 13/4072* (2013.01); *G09G 2370/047* (2013.01); *G09G 2370/10* (2013.01)

(56) References Cited

U.S. PATENT DOCUMENTS

| | | | |
|---|---|---|---|
| 2010/0142723 A1* | 6/2010 | Bucklen | H04R 3/02 |
| | | | 381/81 |
| 2013/0344821 A1* | 12/2013 | Armstrong | H04W 72/1215 |
| | | | 455/79 |
| 2015/0326884 A1* | 11/2015 | Bae | H04N 19/182 |
| | | | 375/240.27 |
| 2017/0012901 A1* | 1/2017 | Tune | G06F 13/14 |
| 2017/0289058 A1* | 10/2017 | Lida | H04L 1/1877 |
| 2018/0077215 A1* | 3/2018 | Mishra | H04L 65/4069 |

OTHER PUBLICATIONS

High Sec Labs Ltd., "2/4-Port Displayport Secure KVM Switch", http://www.highseclabs.com/data/K502_K504_K504E_K524E_DS_Rev1.1.pdf, 2015.

\* cited by examiner

SIGNAL RELAYING DEVICE AND SIGNAL RELAYING METHOD

BACKGROUND OF THE INVENTION

Field of the Invention

This invention relates to DisplayPort (DP), and in particular, it relates to signal relaying device and signal relaying method applicable to the DisplayPort architecture.

Description of Related Art

DisplayPort (DP) is a new generation video display interface technical specification. It can connect personal computers and consumer electronic devices to display screens, and can be used to connect display screens to DVD players and game consoles. DisplayPort is a digital display interface specification defined by the Video Electronics Standards Association (VESA) which establishes various video signal interface specifications. Using DisplayPort, four pairs of transmission lines can transmit 2.7 GHz each (total of 10.8 GHz) in high speed serial transmission. In addition to video data, DisplayPort can be used to transmit audio data, and is compatible with the content copyright protection specification of DisplayPort Content Protection (DPCP).

FIG. 1 is a block diagram of a conventional DisplayPort system. It includes a source device 10 and a sink device 12. The source device 10 is the source of the video data, and the sink device 12 receives the video data and displays it. The source device 10 may include personal computers, audio-video playback devices, etc., and the sink device 12 may include display screens. The data is transmitted between the source device 10 and a sink device 12, via three data links: main link 14, auxiliary channel (AUX CH) 15 and hot plug detect (HPD) line 16.

More specifically, the source device 10 and the sink device 12 use the main link 14 to transmit data (such as video data), use the auxiliary channel 15 to transmit commands, and the sink device 12 can use the hot plug detect line 16 to transmit interrupt requests (IRQ). For example, when the source device 10 is being connected to the sink device 12, the source device 10 receives the hot plug detect signal (HPD) from the sink device 12. The HPD signal is typically a high voltage level signal. The HPD signal will inform the source device 10 to read the status and configuration record of the sink device 12, and establishes the connection using a process called link training. Afterwards, the source device 10 and sink device 12 will transmit data to each other using the auxiliary channel 15; for example, the source device 10 will read the Extended Display Identification Data (EDID) of the sink device 12 in order to determine parameters of the sink device 12 including monitor, manufacturer, model, timing, size, screen resolution, initial brightness, etc. Finally, the source device 10 will start to transmit video data via the main link 14, so that the sink device 12 can display the images.

For specifications used in DisplayPort Secure KVM (such as the PP3.0 specification), it would be desirable to have the ability to limit certain transmission functions of the auxiliary channel 15, for example, prohibiting fast auxiliary channel (Fast AUX) transport format, in order to provide better security and to protect data security. However, current DisplayPort Secure KVMs do not have such abilities. Those skilled in the art will be understand that Fast AUX transport format is an AUX channel data format defined in DP 1.2; it uses 720 Mbps burst transfer and is capable of establishing about 200 Mbps full-duplex link. Fast AUX mode can be used for USB 2.0 data to support USB hub. KVM stands for keyboard, video, mouse and is a switching device that allows a user console to be switched to different computers.

SUMMARY

Accordingly, the present invention is directed to a signal relaying device and signal relaying method applicable in DisplayPort architecture, which has the ability to limit the functions of the auxiliary channel of DisplayPort.

An embodiment of the present invention provides a signal relaying device applicable to DisplayPort architecture, coupled between a source device and a sink device. The signal relaying device includes a receiving end, an arbiter and a transmitting end. The receiving end receives a request signal from the source device via the first auxiliary channel. The arbiter is coupled to the receiving end and receives the request signal. The transmitting end receives the request signal from the arbiter, and transmits the request signal to the sink device via the second auxiliary channel. When the sink device receives the request signal, it transmits a first configuration data back to the transmitting end via the second auxiliary channel. When the arbiter receives the first configuration data from the transmitting end, it replaces the first configuration data with a second configuration data and transmits the second configuration data to the receiving end.

In another aspect, the present invention provides a signal relaying method applicable to DisplayPort architecture, which includes: providing a source device, a signal relaying device and a sink device, and connecting the signal relaying device between the source device and the sink device; the signal relaying device receiving a first configuration data from the sink device, the first configuration data including a first ability value of the sink device; the signal relaying device replacing the first configuration data with a second configuration data, the second configuration data including a second ability value which is different from the first ability value; and the signal relaying device transmitting the second configuration data to the source device.

The signal relaying device and method according to embodiments of the present invention can replace or edit configuration data from the sink device, and transmit the replaced or edited configuration data to the source device, thereby achieving the result of limiting the ability of the DisplayPort auxiliary channel.

It is to be understood that both the foregoing general description and the following detailed description are exemplary and explanatory and are intended to provide further explanation of the invention as claimed.

DETAILED DESCRIPTION OF PREFERRED EMBODIMENTS

Figure 1:
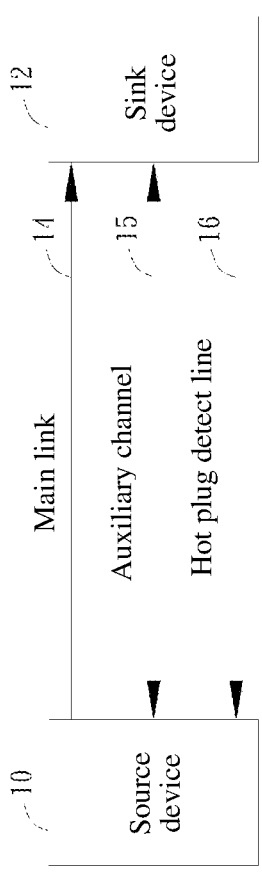
FIG. 1 is a block diagram of a conventional DisplayPort system.
Figure 2:
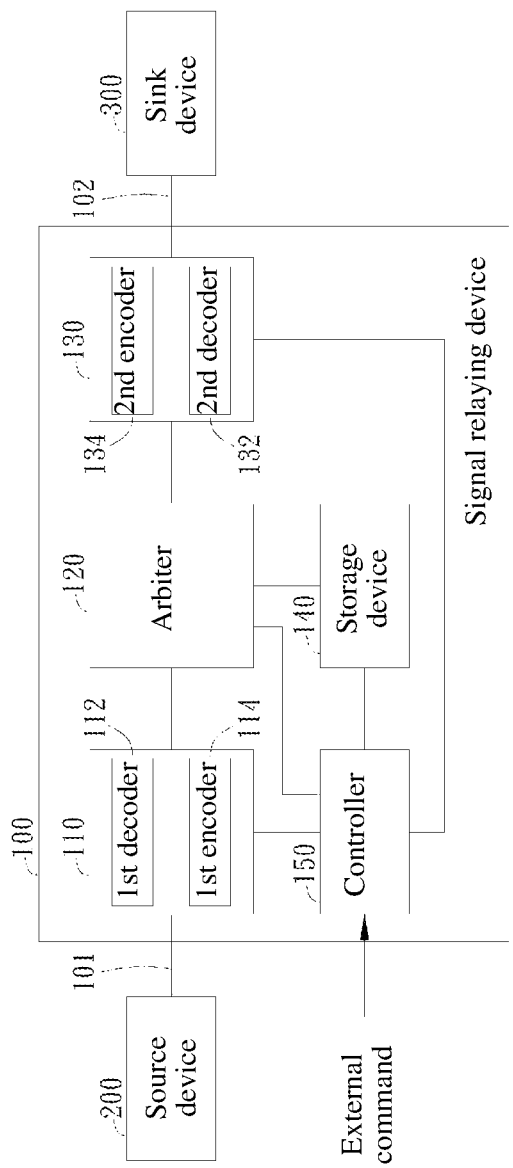
FIG. 2 schematically illustrates a signal relaying device according to an embodiment of the present invention.

Refer to FIG. 2, which schematically illustrates a signal relaying device according to an embodiment of the present"

invention. The signal relaying device 100 is applied in a DisplayPort architecture and coupled between a source device 200 and a sink device 300. The signal relaying device 100 acts as a repeater.

The signal relaying device 100 includes a receiving end 110, an arbiter 120, and a transmitting end 130. The receiving end 110 is coupled via a first auxiliary channel 101 of the DisplayPort to the source device 200. The arbiter 120 is coupled to the receiving end 110 and the transmitting end 130. The transmitting end 130 is coupled via a second auxiliary channel 102 of a DisplayPort to the sink device 300. In this embodiment, the receiving end 110 includes a first decoder 112 and a first encoder 114; the transmitting end 130 includes a second decoder 132 and a second encoder 134. In one embodiment, the signal relaying device 100 additionally includes a storage device 140 and a controller 150, where the storage device 140 is coupled to the arbiter 120, and the controller 150 is coupled to the receiving end 110, the arbiter 120, the transmitting end 130 and the storage device 140. The storage device 140 may include, without limitation, a dynamic random access memory (DRAM) or a flash memory.

In the embodiment shown in FIG. 2, each component may be implemented by electrical circuitry, such as FPGA (field-programmable gate array), and/or processors along with program code stored in computer-readable memory devices and executed by the processors.

Figure 3:
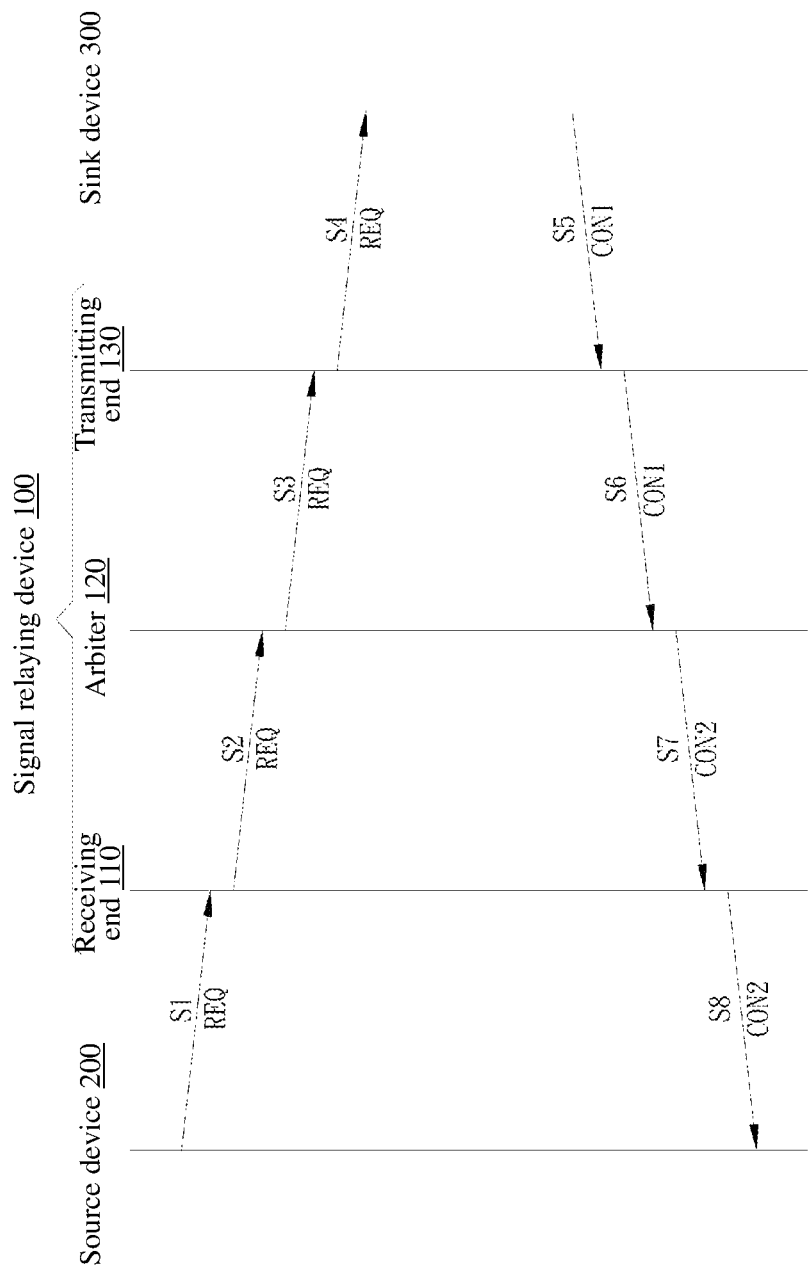
FIG. 3 schematically illustrates a signal relaying method according to an embodiment of the present invention.

Refer to both FIG. 2 and FIG. 3, where FIG. 3 schematically illustrates a signal relaying method according to an embodiment of the present invention. In step S1, the source device 200 transmits, via the first auxiliary channel 101, a request signal REQ to the first decoder 112 of the receiving end 110. The request signal REQ complies with a first data format, the first data format being, for example, the Manchester encoding format. In this embodiment, the request signal REQ includes at least address information representing a configuration data, and content information corresponding to the address information. The content information may be information code that describes or defines the address information, such as a character string or symbols.

In step S2, the first decoder 112 decodes the request signal REQ from the first data format to a second data format, and transmits it to the arbiter 120. The second data format may be, for example, a raw data format.

In step S3, the arbiter 120 receives the request signal REQ from the first decoder 112 of the receiving end 110, and transmits the request signal REQ to the second encoder 134 of the transmitting end 130. In one embodiment, the arbiter 120 may store the address information and the corresponding content information of the request signal REQ, for example, storing them respectively in an address register and a content register. The address register and a content register may be provided in the arbiter 120 or the storage device 140.

In step S4, the second encoder 134 encodes the request signal REQ from the second data format (the raw data format) to a fifth data format, and then transmits it via the second auxiliary channel 102 to the sink device 300. The fifth data format may be, for example, the Manchester encoding format.

In step S5, after the sink device 300 receives the request signal REQ, the sink device 300 replies, via the second auxiliary channel 102, a first configuration data CON1 corresponding to the request signal REQ to the second decoder 132 of the transmitting end 130. In this embodiment, the first configuration data CON1 includes at least a first ability value of the sink device 300, the first ability value including parameters such as, without limitation, fast auxiliary channel (Fast AUX) mode, EDID, etc.

In step S6, the second decoder 132 decodes the first configuration data CON1 from a sixth data format (such as the Manchester encoding format, same as the fifth data format) to a seventh data format (such as the raw data format), and transmits it to the arbiter 120.

In step S7, when the arbiter 120 receives the first configuration data CON1 from the second decoder 132, if the arbiter 120 determines that the first ability value contained in the first configuration data CON1 should be shielded or disabled, i.e., the first ability value should not be launched or executed, then the arbiter 120 based on the previously stored address information and content information corresponding to the address information, which have been previously stored in the address register and the content register, respectively, replaces the first configuration data CON1 by the second configuration data CON2, and transmits the second configuration data CON2 to the first encoder 114 of the receiving end 110. The second configuration data CON2 is stored in the storage device 140 beforehand, or it can be generated by the arbiter 120. It should be noted that the second configuration data CON2 contains a second ability value which is different from the first ability value. For example, the first ability value may specify an enabled state of the Fast AUX ability and its configuration data may be (for example) FAUX_CAP=1, while the second ability value may specify a disabled state of the Fast AUX ability and its configuration data may be (for example) FAUX_CAP=0.

It should be noted that, the above first configuration data CON1 uses an example that includes a first ability value of the sink device sink device 300; in actual application; the first configuration data CON1 may include multiple different ability values, and the arbiter 120 can simultaneously perform the above shielding or disabling operation with respect to several of the multiple ability values.

In one embodiment, the arbiter 120 uses preset data to determine whether the first ability value in the first configuration data CON1 should be shielded or disabled, where the preset data is, for example, data stored beforehand in the arbiter 120 or the storage device 140. For example when the arbiter 120 compares the header address of the first configuration data CON1 with a header address of the preset data, if they are identical, the arbiter 120 uses the second configuration data CON2 to replace the first configuration data CON1.

In another embodiment, a user, or a microcontroller external to the signal relaying device 100 (not shown in the drawings), may provide an external command, to control the arbiter 120 directly via the controller 150 to perform the replacement of the first configuration data CON1 by the second configuration data CON2 or editing of the first configuration data CON1. This can achieve real-time replacement or editing of the first configuration data CON1.

In one embodiment, the second configuration data CON2 is stored in the storage device 140 beforehand. When the arbiter 120 receives the first configuration data CON1, the arbiter 120 retrieves the second configuration data CON2 from the storage device 140 and uses it to replace the first configuration data CON1.

In one embodiment, when the arbiter 120 receives the first configuration data CON1 from the transmitting end 130, the arbiter 120 immediately stores the first configuration data CON1 in the storage device 140, to achieve real-time recording of the first configuration data CON1.

In step S8, the first encoder 114 encodes the second configuration data CON2 from the third data format (such as the raw data format, the same as the seventh data format) to the fourth data format (such as the Manchester encoding format), and transmits it via the first auxiliary channel 101 to the source device 200.

Figure 4:
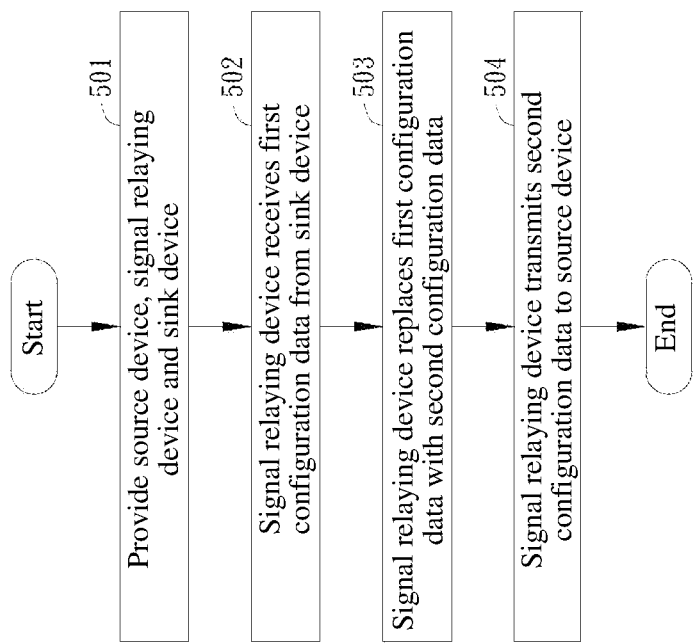
FIG. 4 is a flow chart illustrating steps of a signal relaying method according to an embodiment of the present invention.

Refer to FIG. 4, which a flow chart illustrating steps of a signal relaying method according to an embodiment of the present invention. Referring to both FIG. 3 and FIG. 4, an embodiment of the present invention provides a signal relaying method applicable to DisplayPort architecture. Step 501 includes providing a source device 200, a signal relaying device 100 and a sink device 300, and connecting the signal relaying device 100 to the source device 200 and the sink device 300. In step 502, the signal relaying device 100 receives a first configuration data CON1 from the sink device 300, where the first configuration data CON1 includes at least a first ability value of the sink device 300. For example, the first ability value may be a parameter that enables the Fast AUX channel of the sink device 300. In step 503, the signal relaying device 100 replaces the first configuration data CON1 by the second configuration data CON2, where the second configuration data CON2 includes a second ability value which is different from the first ability value. For example, the second ability value includes a parameter that disables the Fast AUX channel of the sink device 300. In step 504, the signal relaying device 100 transmits the second configuration data CON2 to the source device 200.

In summary, the signal relaying device and method for DisplayPort architecture according to embodiments of the present invention can use the arbiter or an external command to shield or disable a part or all ability values in the configuration data of the sink device. In other words, embodiments of the present invention can, by replacing or editing at least one ability value in the configuration data, limit the ability of the auxiliary channel of the DisplayPort. This improves the security protection and protects data security for a Secure KVM device.

It will be apparent to those skilled in the art that various modification and variations can be made in the signal relaying device and related method of the present invention without departing from the spirit or scope of the invention. Thus, it is intended that the present invention cover modifications and variations that come within the scope of the appended claims and their equivalents.

What is claimed is:

1. A signal relaying device applicable to DisplayPort architecture, coupled between a source device and a sink device, the signal relaying device comprising:
a receiving end, which complies with a DisplayPort standard and includes a first auxiliary channel, the receiving end being configured to receive a request signal from the source device via the first auxiliary channel;
an arbiter, coupled to the receiving end and configured to receive the request signal; and
a transmitting end, which complies with the DisplayPort standard and includes a second auxiliary channel, the receiving ending being configured to receive the request signal from the arbiter and to transmit the request signal to the sink device via the second auxiliary channel;
wherein the transmitting end is configured to, after transmitting the request signal, receive back from the sink device a first DisplayPort configuration data, which has been generated by the sink device in response to the request signal, via the second auxiliary channel and transmit the first DisplayPort configuration data to the arbiter; and
wherein the arbiter is configured to, in response to receiving the first DisplayPort configuration data from the transmitting end, replace the first DisplayPort configuration data with a second DisplayPort configuration data and transmit the second DisplayPort configuration data to the receiving end.

2. The signal relaying device of claim 1, further comprising a storage device, coupled to the arbiter, wherein the second DisplayPort configuration data is stored in the storage device, and wherein after the arbiter receives the first DisplayPort configuration data, the arbiter retrieves the second DisplayPort configuration data from the storage device and uses it to replace the first DisplayPort configuration data.

3. The signal relaying device of claim 1, further comprising a storage device, coupled to the arbiter, wherein after the arbiter receives the first DisplayPort configuration data from the transmitting end, the arbiter stores the first DisplayPort configuration data in the storage device.

4. The signal relaying device of claim 1, further comprising a controller, coupled to the arbiter, wherein the controller controls the arbiter based on an external command to replace the first DisplayPort configuration data with the second DisplayPort configuration data.

5. The signal relaying device of claim 1, wherein the receiving end includes:
a first decoder, configured to decode the request signal from a first data format to a second data format and to transmits it to the arbiter;
a first encoder, configured to encode the second DisplayPort configuration data from a third data format to a fourth data format and to transmit it to the source device.

6. The signal relaying device of claim 5, wherein the transmitting end includes:
a second encoder, configured to encode the request signal from the second data format to a fifth data format and to transmit it to the sink device; and
a second decoder, configured to decode the first DisplayPort configuration data from a sixth data format to a seventh data format and to transmit it to the arbiter.

7. The signal relaying device of claim 6, wherein the request signal includes at least address information and content information corresponding to the address information, wherein after the arbiter receives the request signal from the first decoder, the arbiter stores the address information and the corresponding content information respectively in an address register and a content register.

8. The signal relaying device of claim 7, wherein after the arbiter received the first DisplayPort configuration data from the second decoder, the arbiter replaces the first DisplayPort configuration data with the second DisplayPort configuration data based on the address information and the corresponding content information.

9. The signal relaying device of claim 6, wherein the first data format, the fourth data format, the fifth data format and the sixth data format are a Manchester encoding format.

10. The signal relaying device of claim 9, wherein the second data format, the third data format and the seventh data format are a raw data format.

11. The signal relaying device of claim 1, wherein the first DisplayPort configuration data includes a first ability value of the sink device, and the second DisplayPort configuration data includes a second ability value which is different from the first ability value.

12. The signal relaying device of claim 1, wherein the second ability value is a parameter that disables a fast auxiliary channel transport format of the sink device, the fast auxiliary channel transport format being an auxiliary channel transport format complying with the DisplayPort standard.

13. A signal relaying method applicable to DisplayPort architecture, comprising:
   providing a source device, a signal relaying device and a sink device, wherein the signal relaying device is connected to the source device by a first connection which complies with the DisplayPort standard and which includes a first auxiliary channel, and further connected to the sink device by a second connection which complies with the DisplayPort standard and which includes a second auxiliary channel;
   the signal relaying device transmitting a request signal to the sink device via the second auxiliary channel;
   thereafter, the signal relaying device receiving a first DisplayPort configuration data from the sink device via the second auxiliary channel, the first DisplayPort configuration data having been generated by the sink device in response to the request signal, the first DisplayPort configuration data including a first ability value of the sink device;
   the signal relaying device replacing the first DisplayPort configuration data with a second DisplayPort configuration data, the second DisplayPort configuration data including a second ability value which is different from the first ability value; and
   the signal relaying device transmitting the second DisplayPort configuration data to the source device via the first auxiliary channel.

14. The signal relaying method of claim 13, further comprising, after the signal relaying device receives the first DisplayPort configuration data from the sink device, the signal relaying device storing the first DisplayPort configuration data in a storage device.

15. The signal relaying method of claim 13, wherein the second ability value is a parameter that disables a fast auxiliary channel transport format of the sink device, the fast auxiliary channel transport format being a auxiliary channel transport format complying with the DisplayPort standard.

* * * * *